United States Patent [19]

Buisson et al.

[11] 4,041,356

[45] Aug. 9, 1977

[54] AIR-BREAK CIRCUIT INTERRUPTER HAVING MAGNETICALLY-ASSISTED ARC-DIVIDING ELECTRODES

[75] Inventors: Gaston Buisson, St. Egreve; Jacques Hennebert, Grenoble, both of France

[73] Assignee: Merlin Gerin, Grenoble, France

[21] Appl. No.: 535,116

[22] Filed: Dec. 20, 1974

[30] Foreign Application Priority Data

Dec. 20, 1973 France ................................ 73.45892

[51] Int. Cl.$^2$ ................................................ H02H 7/22

[52] U.S. Cl. ................................ 361/14; 200/144 R; 200/144 A; 200/147 B

[58] Field of Search ........................... 317/11 R, 11 D; 200/147 B, 144 R, 144 A, 144 C, 147 R, 147 A

[56] References Cited

U.S. PATENT DOCUMENTS

| | | | |
|---|---|---|---|
| 2,243,039 | 5/1941 | Ludwig et al. | 200/147 B |
| 2,584,570 | 2/1952 | Frink | 200/147 B |
| 2,668,890 | 2/1954 | Latour | 200/147 B |
| 2,707,739 | 5/1955 | Latour | 200/147 B |
| 2,750,476 | 6/1956 | Latour | 200/147 B |
| 3,139,503 | 6/1965 | Latour | 200/147 B |
| 3,210,504 | 10/1965 | Latour | 200/144 R |
| 3,518,387 | 6/1970 | Latour | 200/144 R |
| 3,629,533 | 12/1971 | Kuznestsov et al. | 200/144 R |

FOREIGN PATENT DOCUMENTS

| | | | |
|---|---|---|---|
| 506,135 | 12/1954 | Italy | 200/147 B |
| 1,205,901 | 9/1970 | United Kingdom | 200/147 B |
| 763,510 | 12/1956 | United Kingdom | 200/147 B |

*Primary Examiner*—J. D. Miller
*Assistant Examiner*—Patrick R. Salce
*Attorney, Agent, or Firm*—Stevens, Davis, Miller & Mosher

[57] ABSTRACT

Air-break circuit interrupter having a plurality of stacked plates of insulating material straddled at the lower edge thereof by electrodes including diverging wing portions extending between the plates to permit the initial arc to be divided by the base portion of the electrodes into a number of elementary arcs extending between the plates to define a helical current path. Inserts of ferromagnetic material are sandwiched between the upstanding legs of the base portion of the electrodes interconnecting the wings thereof in order to enhance the migration of the arc roots along the base portion preventing their stagnation thereon.

3 Claims, 4 Drawing Figures

AIR-BREAK CIRCUIT INTERRUPTER HAVING MAGNETICALLY-ASSISTED ARC-DIVIDING ELECTRODES

This invention relates, generally, to air-break circuit interrupters, and, more particularly, to circuit interrupters having a plurality of stacked plates of insulating material shaped to define therebetween a plurality of shallow arc-extinguishing chambers.

The Belgian Pat. No. 612,385 describes a circuit interrupter of the kind mentioned in which the lower edge of each plate is straddled by a generally V-shaped electrode so that two adjacent electrodes define a pair of upwardly diverging flat arcing wings extending in the corresponding chamber. The arc, which is initially drawn between a pair of separable contacts in a plane transverse of the planes of the plates, is eventually subdivided by the lowermost outer part of the base portion of the electrodes into a number of elementary arcs. The roots of the elementary arcs migrate upwardly along the wings of the electrodes whereby the elementary arcs develop in loops within the shallow arc-extinguishing chambers. The current path formed by the elementary arcs interconnected by the currents flowing in the electrodes has the shape of an expanding helix. The different arcs are cooled by the intimate contact thereof with the walls of the chambers, that is, by the faces of the plates, and this cooling, combined with the elongation of the elementary arcs due to the electrodynamic effect of the coil formed by the current, causes the extinction of the arcs and the breaking of the current.

While the necessary expansion of the elementary arc loops in the chambers is thus achieved as soon as the arc roots attached to the electrodes have reached the upper part of the electrodes, means must in certain cases be provided to prevent the stagnation of the arc roots at the lowermost part of the electrodes, that is, at the base or web portion interconnecting the wings. The means forming the subject matter of the Belgian Patent comprise base portions of the electrodes having a convex peripheral bead producing an electrodynamic repulsion which causes the arc roots to move upwardly towards the wings of the electrodes.

It is an object of the present invention to provide a further means preventing the stagnation of the elementary arcs at the base of the electrodes, more particularly in the case of electrodes bent from sheet metal. According to an aspect of the present invention, small slabs of ferromagnetic material fill substantially the space left between the upstanding parts of the generally U-shaped base portion of the electrodes. Thus a low-reluctance path is provided for the magnetic flux produced by the loop currents flowing through the base portion of the electrodes so that an increased magnetic field may enhance the migratory movement of the arc roots attached to the base portions from the lowermost part thereof towards the wings.

Other advantages and features of the invention will become apparent from reading of the following description of a preferred embodiment of the invention, shown by way of example only in the annexed drawings in which.

Figure 1:
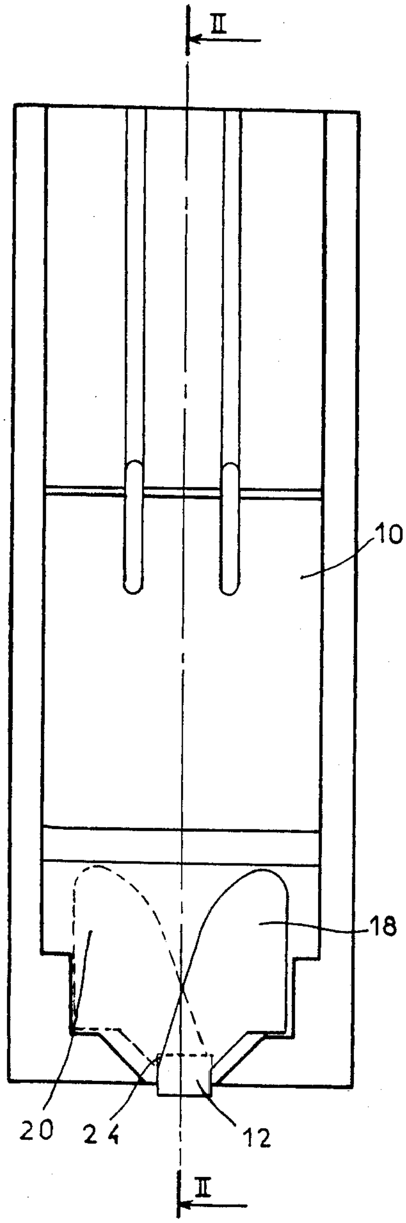
FIG. 1 is an elevational view of a plate of a circuit interrupter according to the invention.
Figure 2:
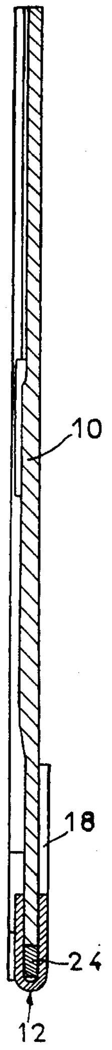
FIG. 2 is a cross-sectional view taken along line II—II of FIG. 1.
Figure 3:
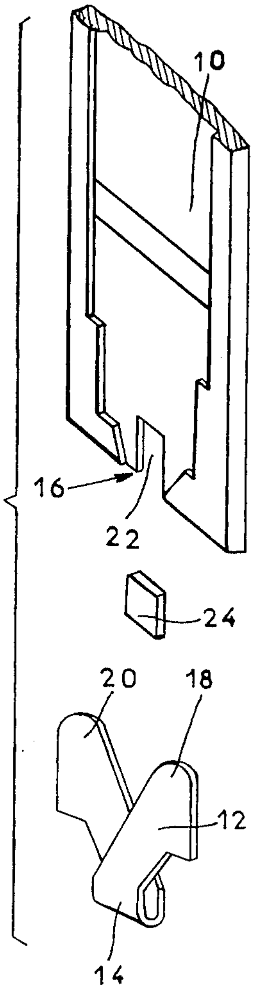
FIG. 3 is an exploded perspective view of the lower part of a plate according to FIG. 1.

In the FIGS. 1 to 3, only one plate of a series of stacked plates of insulating material is shown to permit a better understanding of the invention. A circuit interrupter according to the invention may comprise an arc-extinguishing chamber comprising a stack of superposed plates 10 as shown but other plates may be inserted between electrode-carrying plates, more particularly notched plates not carrying electrodes the final stack comprising for example electrode-carrying plates alternating with notched plates devoid of electrodes in any appropriate arrangement well-known in the art.

A plate 10 according to the invention, of arc-proof material, is shaped to define a peripheral bead surrounding a shallow central cavity on both lateral sides and at the lower edge, the upper edge being in free communication with the atmosphere to permit the exhaust of the arc gases developed during the arc-extinguishing process. The different plates are stacked so that the peripheral beads are engagement, if desired with interposition of sealing joints or gaskets. In this manner a shallow arc-extinguishing chamber is defined between each pair of adjacent plates 10.

An electrode 12 of sheet metal, generally of copper sheet, is bent over the lower edge of the plate 10. The electrode is shaped to define a generally U-shaped base portion 14 whereby each upstanding leg of the base portion is prolonged by a wing 18, 20, respectively, extending on either side of the plate 10. In this manner, a pair of upwardly diverging wings 18, 20 is disposed in each chamber, the wings in a given chamber belonging of course to a pair of different electrodes straddling the lower edge of two neighbouring plates. Preferably, the lower edge of the plate 10 is cut out at 22 to permit the lodging of a small slab 24 of ferromagnetic material sandwiched between the upstanding legs of the base porition 14 and filling substantially the space between said legs and the lower cross yoke of the base portion interconnecting the legs.

This device operates in the following manner (for further details reference may be had to the above-mentioned Belgian Patent, for example):

An initial arc is drawn between a pair of separating contacts (not shown) in a direction transverse of the plane of the stacked plates 10, only one of which is shown in the FIGS. 1 to 3. The arc engages the lowermost outer part of the cross link of the base portion 14 of each electrode 12 and is thus divided into a number of elementary arcs having their arc roots attached to the electrodes. The rounded semicircular shape of the base portion of the electrodes contributes to the rapid rising of the arc roots towards the diverging wings 18, 20 by electrodynamic repulsion. The provision of the ferromagnetic insert 24 between the legs of the base portion of each electrode offers a return path of small reluctance of the magnetic field produced by the loop-shaped currents flowing through the base portion 14 of each electrode 12. Thus, the inserts 24 prevent the stagnation of the arc roots on the base portion and produce on the contrary forces urging the roots to move swiftly towards the wings 18 and 20. From then onwards, the elementary arcs may freely develop into loops in the shallow arc-extinguishing chambers defined between the plates, forming together a helical coil which expands due to its own field. Subsequently, the lengthening arcs are quenched in a well-known manner by deionization produced by the contact with the relatively cool well portions of the plates. The presence of the inserts 24 at the base portions of the plates does not interfere with the arc-extinguishing process in the arc-extinguishing chambers.

Figure 4:
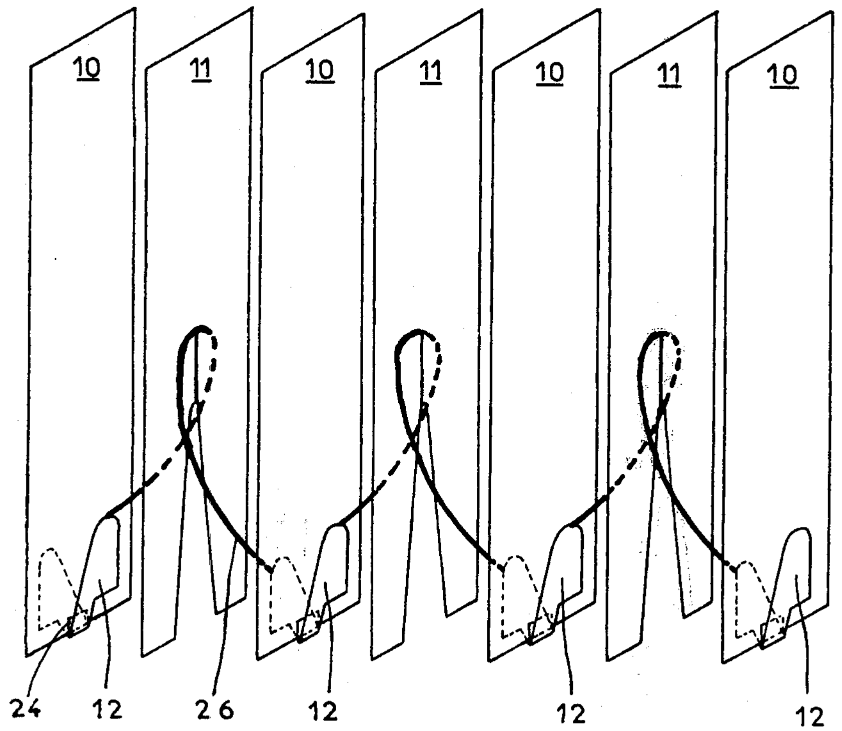
FIG. 4 shows an exploded perspective view of a switch embodying the arrangement of FIG. 1.

In the arc-extinguishing chamber of FIG. 4, notched plates 11, not carrying electrodes, are inserted in a well-known manner between electrode-carrying plates 10, so that the elementary arcs form together a helical coil 26.

What we claim is:

1. An air-break circuit interrupter comprising:

a plurality of stacked plates of insulating material shaped to define therebetween a plurality of shallow arc-extinguishing chambers;

a plurality of electrodes straddling the lower edge of said plates, respectively, and having a generally U-shaped base portion interconnecting a pair of upwardly diverging flat arcing wings extending in said chambers in such a manner that an arc drawn below said plates transversely thereof may eventually divide into a number of elementary arcs upon contact with the lowermost part of said base portion of said electrodes, the diverging wings of adjacent electrodes extending in each chamber causing the corresponding elementary arc to develop in said chamber in an expanding loop so that the path of the current flowing in said electrodes and in said elementary arcs develops substantially in the form of an expanding helix; and a plurality, one for each electrode, of inserts of ferromagnetic material sandwiched between the upstanding parts of said U-shaped base portion of said electrodes thereby to enhance the migratory movement of the roots of said elementary arcs attached to said electrodes from said lowermost part along said upstanding parts toward said wings.

2. An air-break circuit interrupter according to claim 1, wherein each electrode is bent of sheet metal, each insert being comprised of a slab of ferromagnetic material filling substantially the space defined between said upstanding parts.

3. An air-break circuit interrupter according to claim 2, wherein said lower edge of each plate is cut out to accomodate the corresponding slab.

* * * * *